United States Patent [19]
Van Rheenen

[11] Patent Number: 5,922,777
[45] Date of Patent: Jul. 13, 1999

[54] COATING COMPOSITIONS CONTAINING ION EXCHANGE RESINS

[76] Inventor: Paul Ralph Van Rheenen, 190 Tally Ho Dr., Warminster, Pa. 18974

[21] Appl. No.: 08/950,019

[22] Filed: Oct. 14, 1997

Related U.S. Application Data

[60] Provisional application No. 60/027,701, Oct. 15, 1996.

[51] Int. Cl.$^6$ .............................. C08J 9/224; C08J 5/20; C08J 3/21
[52] U.S. Cl. .............................. 521/28; 524/522; 523/334
[58] Field of Search .............................. 521/28; 524/522; 523/334

[56] References Cited

U.S. PATENT DOCUMENTS

| | | | |
|---|---|---|---|
| 3,494,878 | 2/1970 | Harren et al. | 521/28 |
| 3,847,857 | 11/1974 | Haag et al. | 521/28 |
| 4,012,351 | 3/1977 | Hall et al. | 524/238 |
| 4,972,000 | 11/1990 | Kawashima et al. | 521/54 |
| 5,312,863 | 5/1994 | Van Rheenen et al. | 524/555 |

FOREIGN PATENT DOCUMENTS 0571069  11/1993  European Pat. Off. .

OTHER PUBLICATIONS

Patent Abstracts of Japan, vol. 096, No. 002, Feb. 29, 1996.

Patent Abstracts of Japan, vol. 017, No. 478 (C–1104), Aug. 31, 1993.

Patent Abstracts of Japan, vol. 005, No. 188 (C–081), Nov. 27, 1981.

*Primary Examiner*—James J. Seidleck
*Assistant Examiner*—Olga Asinovsky
*Attorney, Agent, or Firm*—Kevin F. Gironda, Patent Agent

[57] ABSTRACT

Gift free coating with improved tannin stain blocking, nicotine stain blocking, efflorescencee resistance, and water spot resistance are disclosed. Pre-treated ion exchange resins are incorporated into the coating compositions to achieve the improvements.

10 Claims, No Drawings

COATING COMPOSITIONS CONTAINING ION EXCHANGE RESINS

This is a nonprovisional application of prior pending provisional application Ser. No. 60/027,701 filed Oct. 15, 1996.

This invention relates to coating compositions containing ion exchange resins and a method for improving coating compositions.

Coating compositions are routinely applied to substrates. Many substrates contain water-soluble staining agents. The substrates may be exposed to cigarette smoke, which frequently causes nicotine staining. Nicotine staining is the change in color of a light-colored coating to a slightly brown color, resulting from cigarette smoke. The coating may also be exposed to water, which frequently causes water pick up. Water spotting is the discoloration of a coating where water was present. Some substrates, such as redwood, cedar, mahogany, and other colored woods contain tannins. When these types of substrates are coated, the tannins frequently leach from the substrate into the coating composition, causing stains to appear on the surface of the coating. This is known as tannin staining. Efflorescence is an appearance defect of paints placed on cementitious substrates caused by the migration of salt to the paint surface where crystals of these salts show up as white deposits. The defects are particularly noticeable on darker colored paints.

Nicotine staining, water spotting, efflorescence, and tannin staining are highly undesirable in coatings. Attempts have been made to resolve these problems by adding ion-exchange resins to the coating compositions, however, grit can form when the ion exchange resin is added to the coating composition. Grit is suspended gum like material which is highly undesirable in coating compositions because grit makes the surface of the dried coating uneven. There is an ongoing need for grit-free coating compositions and methods for improving nicotine staining, water spotting, efflorescence, and tannin staining.

There have been several attempts in the past to provide stain resistant coatings using ion exchange resins. U.S. Pat. No. 3,494,878 discloses stain resistant water-based coating compositions. The coating compositions contain water-insoluble addition polymers and ion exchange resins. The ion exchange resins may be added as is, or may be ground prior to addition to the coating composition. U.S. Pat. No. 3,847,857 discloses sedimentation stable aqueous coating compositions which are resistant to staining. The compositions contain amine or quaternary ammonium groups with or without counterions of a polyvalent metal.

Despite the disclosures, there is an ongoing need for grit-free coating compositions and methods for improving nicotine staining, water spotting, tannin staining, and efflorescence.

We have surprisingly found that grit can be avoided if the anion exchange resin is first treated ("pre-treated") with a water-soluble anionic polymer prior to addition to the coating composition. We have also surprisingly found that the coating compositions containing the ion exchange resin have improved nicotine stain blocking, water spotting resistance, tannin stain blocking, and efflorescence.

In a first aspect, the present invention provides a grit-free coating composition comprising an emulsion polymer; an ion exchange resin with a particle size of from 0.1 microns to 50 microns; and a water-soluble anionic polymer with a molecular weight of from 2,000 to 200,000, the ion exchange resin having been treated with the water-soluble anionic polymer prior to combination with the emulsion polymer.

In a second aspect, the present invention provides a method of producing a grit-free coating composition comprising:

(a) providing an ion exchange resin, (b) providing a water-soluble anionic polymer with a molecular weight of from 2,000 to 200,000, (c) grinding the ion exchange resin to a particle size of from 0.1 microns to 50 microns, (d) treating the ion exchange resin with the water-soluble anionic polymer, (e) providing an emulsion polymer, and (f) admixing the ground, treated, ion exchange resin and the emulsion polymer.

Coating compositions frequently contain emulsion polymers. Emulsion polymers as used herein are defined as compositions containing an emulsion-polymerized, water-insoluble addition polymer with a glass transition temperature ("Tg") of from −50 degrees centigrade ("° C.") to 150° C. as measured by differential scanning calorimetry (DSC). Preferred are emulsion-polymerized polymers with a glass transition temperature of from −10° C. to 120° C. Most preferred are thermoplastic emulsion polymers with a glass transition temperature of from 0° C. to 90° C.

The emulsion polymer may be prepared by the addition polymerization of at least one ethylenically unsaturated monomer such as, for example, acrylic ester monomers including methyl acrylate, ethyl acrylate, butyl acrylate, 2-ethylhexyl acrylate, decyl acrylate, methyl methacrylate, butyl methacrylate, hydroxyethyl methacrylate, and hydroxypropyl acrylate; acrylamide or substituted acrylamides; styrene or substituted styrenes; butadiene; vinyl acetate or other vinyl esters; vinyl monomers such as vinyl chloride, vinylidene chloride, N-vinyl pyrolidone; and acrylonitrile or methacrylonitrile. Low levels of copolymerized ethylenically unsaturated acid monomers such as, for example, 0.1%–7%, by weight based on the weight of the emulsion-polymerized polymer, acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride may be used. Preferred are butyl acrylate, 2-ethylhexyl acrylate, methyl methacrylate, butyl methacrylate, acrylic acid, methacrylic acid, and styrene copolymers thereof. Preferred acrylic copolymers with styrene contain from 10% to 90% styrene based on the total weight of the polymer. The polymers may be single-stage or multi-stage polymers. The GPC molecular weight on a weight number basis of the polymer is from 75,000 to 5,000,000.

The coating composition may contain a crosslinking agent, such as, for example, a polyaziridine, polyisocyanate, polycarboduimide, polyepoxide, polyaminoplast, polyalkoxy silane, polyoxazolidine, polyamine and a polyvalent metal compound; providing that the crosslinking agent does not inhibit film formation. Typically, from 0.05 weight percent to 30 weight percent of the crosslinking agent is used, based on the weight of the polymer solids.

The emulsion polymer may be blended with other polymers, such as, for example, a polyurethane, a polyester, an acrylic copolymer, a styrene/acrylic copolymer, or other polymers.

The emulsion polymerization techniques used to prepare such thermoplastic emulsion polymers are well known in the art. See, for example, U.S. Pat. No. 5,346,954. Multi-stage polymers are well known in the art and are disclosed, for example, in U.S. Pat. Nos. 4,325,856, 4,654,397, and 4,814, 373. Surfactants such as, for example, anionic and/or nonionic emulsifiers such as alkali or ammonium alkyl sulfates, alkyl sulfonic acids, fatty acids, and oxyethylated alkyl phenols may be used in this polymerization. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, ammonium and alkali persulfates, typically at a level of 0.05% to 3% by weight, based on the weight of total monomer. Redox systems using the same initiators coupled with a suitable reductant such as, for example, isoascorbic acid and sodium bisulfite may be used at similar levels.

The solids content of the emulsion polymer is from 20% to 70% by weight. The viscosity of the emulsion polymer is from 50 centipoises ("cps") to 10,000 cps, as measured using a Brookfield viscometer (Model LVT using spindle #3 at 12 rotations per minute).

The coating composition may contain, in addition to the emulsion polymerized polymer, conventional components such as, for example, emulsifiers, pigments and fillers, dispersants, coalescing agents, curing agents, thickeners, humectants, wetting agents, biocides, plasticizers, antifoaming agents, colorants, waxes, and antioxidants. The amount of the emulsion polymer in the coating composition is from 20% to 97.5% on a weight basis.

As described earlier, ion exchange resins are used in the present invention to improve the performance of the coating compositions. The ion exchange resins are typically crosslinked styrene polymers with functional groups such as, for example, sulfonamide, trialkylamino, tetraalkyl ammonium, carboxyl, carboxylate, sulfonic, sulfonate, hydroxyalkyl ammonium, iminodiacetate, amine oxide, phosphonate, and others known in the art. The ion exchange resins may be macroreticular resins. The preparation of ion exchange resins is known in the art, see for example, U.S. Pat. No. 4,283,499.

The amount of ion exchange resin used in this invention is typically from 2.5% to 40% based on the volume solids of the paint or coating. More preferred is from 10% to 30% ion exchange resin based on the volume solids of the paint. Most preferred is from 15% to 25% ion exchange resin based on the volume solids of the paint.

Prior to addition to the coating composition, the ion exchange resin is pre-treated by admixing the ion exchange resin with a water soluble anionic polymer. By pre-treatment is meant contacting, admixing, or coating. The pre-treatment provides stability as defined as a grit-free composition when mixed with anionic paint components, such as emulsion polymers and pigment dispersions. The composition is considered to be grit-free for practical purposes when a rating of greater than 8 on a scale of 1 to 10 is obtained. Pre-treatment may occur by grinding the ion exchange resin in the presence of the water soluble anionic polymer. Pre-treatment may also occur by grinding the ion exchange resin separately, and then admixing the ion exchange resin with the water soluble anionic polymer.

Ion exchange resins may be ground by any milling equipment suitable for producing particles in the size range of 0.1 to 50 microns, more preferably 0.25 microns to 35 microns, and most preferably from 0.5 microns to 25 microns. The particle size may be measured on a Coulter™ LS, light scattering, particle size analyzer. Suitable mills are attrition mills, fluid—energy mills, colloid mills, vibratory ball mills (vibro-energy mills), pin mills, ball mills, roller mills, and autogenous and semiautogenous mills. Likewise a combination of mills could be used to possibly increase speed where the first mill reduces particle size to, for example, 100 to 1000 microns and a second mill reduces the particle size further to the desired range. An example would be the initial use of a hammer mill followed by a semiautogenous mill like a Dyno-Mill™ from CB Mills Inc (Buffalo Grove, Ill.).

The preferred method of grinding is wet grinding where the ion exchange resin, water, and pre-treatment water soluble polymer are ground together to form a slurry of ion exchange particles. The pre-treatment polymer can be added after the resin is ground, but this can cause the system to go through a very high viscosity stage as the pre-treatment polymer is mixed in and equilibrates on to the resin particles.

It is important to the invention to use water soluble anionic polymers that are high enough in MW so that they are not able to diffuse into the interior of the particles. In this way the surface of the particles is treated while at the same time the interior groups of the ion exchange particles are most free to interact and complex with staining agents etc. Typically, the molecular weight of the water soluble anionic polymer used in this invention is from 2,000 to 200,000. More preferred is a molecular weight of from 10,000 to 100,000. Most preferred is a molecular weight of from 20,000 to 50,000.

The amount of water soluble anionic polymer used in this invention is typically from 1% to 50% based on the weight of the ion-exchange resin. More preferred is from 2% to 20% water soluble anionic polymer based on the weight of the ion-exchange resin. Most preferred is from 3% to 15% water soluble anionic polymer based on the weight of the ion-exchange resin.

The water-soluble polymers contain one or more monomers that are unsaturated acid monomers or water-soluble salts thereof. Water-soluble salts of the unsaturated acid monomers are, for example, the alkali metal salts (such as sodium or potassium) and the ammonium or substituted ammonium salts thereof. Unsaturated acid monomers can be monoacids such as unsaturated monocarboxylic acid monomers, diacids such as unsaturated dicarboxylic acid monomers, or polyacids.

"Unsaturated carboxylic acid monomer," as used herein, refers to unsaturated monocarboxylic acid monomers, unsaturated dicarboxylic acid monomers and any unsaturated monomer containing more than two carboxylic acid groups, e.g., polyacid, and water-soluble salts thereof.

"Unsaturated monocarboxylic acid monomer," as used herein, refers to unsaturated carboxylic acid monomers containing a single carboxylic acid group and water-soluble salts thereof. Suitable unsaturated monocarboxylic acid monomers are, for example, but not limited to, acrylic acid, oligomeric acrylic acid, methacrylic acid, crotonic acid and vinylacetic acid.

"Unsaturated dicarboxylic acid monomer," as used herein, refers to unsaturated dicarboxylic acid monomers containing 4 to 10, preferably from 4 to 6, carbon atoms per molecule and anhydrides of the cis-dicarboxylic acids, and water-soluble salts thereof. Suitable unsaturated dicarboxylic acid monomers useful in the process of the present invention include, for example, maleic acid, maleic anhydride, fumaric acid, cc-methylene glutaric acid, itaconic acid, citraconic acid, mesaconic acid, cyclohexenedicarboxylic acid, cis-1,2,3,6-tetrahydrophthalic anhydride (also known as cis-4-cylcohexene-1,2-dicarboxylic anhydride), 3,6-epoxy- 1,2,3,6-tetrahydrophthalic anhydride, 5-norbornene-2,3-dicarboxylic anhydride, bicyclo[2.2.2]-5- octene-2,3-dicarboxylic anhydride, 3-methyl-1,2,6-tetrahydrophthalic anhydride and 2-methyl-1,3,6-tetrahydrophthalic anhydride. Preferred unsaturated dicarboxylic acid monomers are maleic acid and maleic anhydride.

Suitable unsaturated "non-carboxylic" acid monomers include, for example, allylsulfonic acid, allylphosphonic acid, allyloxybenzenesulfonic acid, 2-acrylamido-2-methylpropanesulfonic acid (the acryonym "AMPS" for this monomer is a trademark of Lubrizol Corporation, Wickliffe, Ohio, U.S.A.), 2-hydroxy-3-(2-propenyloxy) propanesulfonic acid, 2-methyl-2-propene-1-sulfonic acid, isopropenylphosphonic acid, vinylphosphonic acid, phosphoethyl methacrylate, styrenesulfonic acid, vinylsulfonic acid and the alkali metal and ammonium salts thereof. A preferred unsaturated "non-carboxylic" acid monomer is 2-acrylamido-2-methyl-propanesulfonic acid.

Suitable unsaturated acid-free monomers include ($C_1$–$C_4$) alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate. Other unsaturated acid-free monomers are acrylamides and alkyl-substituted acrylamides including acrylamide, methacrylamide, N-tert-butylacryl-amide, N-methylacrylamide, dimethylaminopropylmethacrylamide, and N,N-dimethylacrylamide. Additional examples of unsaturated acid-free monomers include acrylonitrile, methacrylonitrile, allyl alcohol, 2-vinylpyridine, 4-vinyl-pyridine, dimethylaminoethylmethacrylate, N-vinylpyrrolidone, N-vinylformamide, N-vinylimidazole, vinyl acetate, hydrolyzed vinyl acetate and styrene.

The amount of water-soluble anionic polymer used for pre-treatment of the ion exchange resin should be minimized by increasing the molecular size of the water-soluble anionic polymer. In this way the surface of the ion exchange resin is coated while at the same time a minimum number of interior exchange sites are taken up by the water-soluble anionic polymer. This is important in that polycarboxyl functional materials like water-soluble anionic polymers have a fairly high affinity, relative to the standard of 1, for the ion exchange sites in anion exchange resins. For example, the relative affinity of acetic acid for tetraalkyl ammonium functional anion exchange resin is 3.2 compared to 220 for citric acid, where the reference is hydroxide ion which has an affinity of 1. (Duolite Ion-Exchange Manual 1969, Diamond Shamrock Chemical Co.) It is harder for an anionic staining agent to become attached to the ion exchange resin by replacing an existing anion if the existing anion is a polyfunctional carboxylic acid and not a low affinity anion such as, for example, hydroxide or acetate ion. The end effect is a reduction in stain blocking ability if all sites in the ion exchange resin are occupied by water-soluble anionic polymer.

As used herein, water-soluble anionic polymers are anionic polymers which are soluble in pH 7 deionized water at a minimum of 10% based on weight. Water soluble polymers useful in the present invention can be made by methods of polymerization known to those skilled in the art. The polymerizations can be conducted as cofeed, heel, semi-continuous or continuous processes. When the polymerization is conducted as a heel process most, or all, of the one or more unsaturated non-ionizable monomers and any of the unsaturated dicarboxylic acid monomers, if used, are present in the reactor and the one or more unsaturated monocarboxylic acid monomers are fed into the reactor over time. Generally, the feeds are conducted for periods of time from 5 minutes to 5 hours, preferably from 30 minutes to 4 hours, and most preferably from 1 hour to 3 hours.

When the polymerization is run as a cofeed process, initiator and the monomers are introduced into the reaction mixture as separate feed streams that are added linearly over time, i.e., at constant rates. Optional components of the reaction mixture, such as unsaturated dicarboxylic acid monomers, neutralizer solutions, chain regulators and metals, may also be fed into the reaction mixture as separate feed streams or combined with one or more of the other feed streams. Preferably, the optional components are present in the heel. If desired, the streams can be staggered so that one or more of the streams are completed before the others. If desired, a portion of the monocarboxylic acid and non-ionizable monomers and the dicarboxylic acid monomers, if used, and/or a portion of the initiators may be added to the reactor before addition of the monomers is started. The monomers can be fed into the reaction mixture as individual feed streams or combined into one or more feed streams.

The processes by which the water-soluble anionic polymers of the present invention are prepared can be aqueous, solvent or emulsion polymerization; preferably they are prepared by aqueous processes, i.e., substantially free of organic solvents. Water may be introduced into the reaction mixture initially, as a separate feed stream, as the solvent for one or more of the other components of the reaction mixture or some combination thereof. Generally, the polymerizations have final solids levels in the range of 20 to 80%, preferably 30 to 70%, by weight of the reaction mixture.

The temperature of the polymerization reaction will depend on the choice of initiator and target molecular weight. Generally, the temperature of the polymerization is up to the boiling point of the system, although the polymerization can be conducted under pressure if higher temperatures are used. Generally, the temperature of the polymerization is from 25 to 120° C. and preferably from 65 to 110° C.

Suitable initiators for preparing the water-soluble anionic polymers of the present invention are any conventional water-soluble initiators. Among the suitable initiators that may be used are thermal free-radical initiators, such as hydrogen peroxide, certain alkyl hydroperoxides, dialkyl peroxides, persulfates, peresters, percarbonates, ketone peroxides and azo initiators. Specific free-radical initiators include, for example, hydrogen peroxide, tert-butyl hydroperoxide, di-tert-butyl peroxide, ammonium persulfate, potassium persulfate, sodium persulfate, tert-amyl hydroperoxide and methyl ethyl ketone peroxide. The free-radical initiators are typically used in amounts of 0.5 to 25% based on the total monomer weight. The amount of initiator used will vary according to the desired molecular weight of the resulting polymer and the relative amount of both unsaturated non-ionizable monomers and optional unsaturated dicarboxylic acid monomers. As the relative amount of optional dicarboxylic acid monomer and unsaturated non-ionizable monomer increases, or as the desired molecular weight of the polymer decreases, larger amounts of initiator are preferred.

Water-soluble redox initiator systems may also be used. Redox initiator sytems include reducing agents, for example, sodium bisulfite, sodium sulfite, hypophosphites, phosphites, isoascorbic acid, sodium formaldehyde-sulfoxylate and hydroxylamines, used in conjunction with suitable oxidizing agents, such as the thermal free-radical initiators noted above. The redox initiator systems are typically used in amounts from 0.05 to 10%, preferably from 0.5 to 5%, based on the weight of total monomer. Combinations of initiators may be used; a particularly preferred combination of initiators is persulfate and peroxide.

One or more water-soluble metal salts may be used to promote polymerization and to control the molecular weight of the resulting polymers. Water-soluble metal salts, such as the salts of copper, iron, cobalt and manganese, are typically used at levels from 1 to 200 parts per million (ppm), preferably from 3 to 100 ppm, of the metal ion, based on the weight of polymerizable monomers. Preferred metal salts are copper and iron salts, which include all inorganic and organic compounds that will generate copper or iron ions in aqueous solution. Suitable salts include, for example, sulfates, nitrates, chlorides, acetates and gluconates.

It is generally desirable to control the pH of the polymerizing monomer mixture whether using a redox initiator or thermal initiator. The pH of the polymerizing monomer mixture can be controlled by a buffer system or by the addition of a suitable acid or base. The pH of the system can be adjusted to suit the choice of the redox system by the addition of a suitable acid or base, if needed.

In processes where all or some of the monomers are gradually added to the reaction mixture, the pH of the reaction mixture can also be controlled by gradual addition of a neutralizer. Examples of suitable neutralizers include, for example, sodium, potassium or ammonium hydroxide and amines, such as, triethanolamine and ammonia-water. These neutralizers are used as aqueous solutions and can be gradually added into the reaction mixture as a separate feed stream or as part of one of the other feed streams. Typical levels of neutralizers are from 20 to 95 equivalent % of base, preferably from 20 to 80 equivalent % of base, based on the total acid functionality of the monomer components.

The water-soluble anionic polymer's water-solubility is affected by pH, the molecular weight of the polymers and the relative amounts, and hydrophilicity of monomer components incorporated into the polymer. If desired, chain regulators or chain transfer agents may be employed to assist in controlling the molecular weight of the polymers. Any conventional water-soluble chain regulator or chain transfer agent can be used. Suitable chain regulators include, for example, mercaptans, hypophosphites, phosphites, alcohols and bisulfites. If used, mercaptans (such as 2-mercaptoethanol), bisulfites (such as sodium metabisulfite) or hypophosphites are preferred.

The following examples are intended to illustrate the properties of this invention. Unless otherwise specified, all measurements of solids is by weight. The molecular weight of the water soluble anionic polymers was determined by aqueous Gel Permeation Chromatography in 0.05M sodium acetate, adjusted to pH 6.8 with sodium hydroxide. Data acquisition, calibration and computation was performed using poly-acrylic acid standards.

Polymers 1–11 —Water-Soluble Anionic Polymers For The Pre-Treatment Of Ion Exchange Resins.

The following water-soluble anionic polymers for the pre-treatment of ion exchange resin were prepared:
Polymer 1 was a homopolymer of acrylic acid made by aqueous solution polymerization. Reaction conditions were adjusted so as to give a weight average molecular weight of 2000 and a total solids of 48%.
Polymer 2 was a homopolymer of acrylic acid made by aqueous solution polymerization. Reaction conditions were adjusted so as to give a weight average molecular weight of 10,000 and a total solids of 40%.
Polymer 3 was a homopolymer of acrylic acid made by aqueous solution polymerization. Reaction conditions were adjusted so as to give a weight average molecular weight of 26,400 and a total solids of 42.16%.
Polymer 4 was a homopolymer of acrylic acid made by aqueous solution polymerization. Reaction conditions were adjusted so as to give a weight average molecular weight of 50,000 and a total solids of 25%.
Polymer 5 was a copolymer of 70% acrylic acid and 30% maleic anhydride made by aqueous solution polymerization (Acusol® 479N, Rohm and Haas Company). Reaction conditions were adjusted so as to give a weight average molecular weight of 30,000 and a total solids of 40%. The polymer was neutralized with NaOH to pH 7.
Polymer 6 was Versa® TL -71 from National Starch and Chemical Company. The polymer is polystyrene sulfonic acid supplied at 30% total solids and weight average molecular weight of 70,000.
Polymer 7 was Versa® TL -125 from National Starch and Chemical Company. The polymer is the ammonium salt of polystyrene sulfonic acid supplied at 30% total solids and a weight average molecular weight of 120,000.
Polymer 8 was a copolymer of 63% butyl methacrylate and 37% methacrylic acid made by emulsion polymerization. Reaction conditions were adjusted so as to give a weight average molecular weight of 7000 and a total solids of 43.2%. The polymer was neutralized with ammonia to convert it into a water soluble polymer.
Polymer 9 was the sodium salt of a homopolymer of methacrylic acid made by aqueous solution polymerization. Reaction conditions were adjusted so as to give a weight average molecular weight of 4000 and a total solids of 40%.
Polymer 10 was the sodium salt of a homopolymer of methacrylic acid made by aqueous solution polymerization. Reaction conditions were adjusted so as to give a weight average molecular weight of 12000 and a total solids of 30%.
Polymer 11 was the sodium salt of a homopolymer of acrylic acid made by aqueous solution polymerization. Reaction conditions were adjusted so as to give a weight average molecular weight of 60000 and a total solids of 35%.

Ion Exchange Resins A–K—Ground Ion Exchange Resin Compositions.

Ion exchange resins were ground as follows:
Untreated Resin A Dispersion was an ion exchange resin (Ion Exchange Resin A) which consisted of a crosslinked styrene/6.5% divinyl benzene copolymer containing about 1 quaternary ammonium group per benzene nucleus. The hydroxide form of the resin was used. The bead size of the resin was about 0.5 mm and the water content was 45%. To 200 grams of this ion exchange resin was added 250 grams of water to adjust the polymer solids to 20%. This mix was ground for three hours on a vibro-energy mill (Sweco Inc.) using 1.25 inch ceramic cylinders to give an average particle size of 5 microns as measured on a Coulter™ LS, light scattering, particle size analyzer. A broad particle size distribution was obtained as indicated on the analysis report, covering the range of about 1 micron to 40 microns.
Pre-Treated Resin B was a mixed bed ion exchange resin (Ion Exchange Resin B)(Amberlite® IRN150, Rohm and Haas Company) consisting of a mixture of equal equivalents of a cation exchange resin (sulfonic acid functional resin in the hydrogen form ) and equal equivalents of Ion Exchange resin A. The resin contained 0.55 milliequivalents/ml of cation or anion exchange capacity. The resin contained a water content of 60%. The following blend of materials was ground as in Untreated resin A to give 20% solids on ion exchange resin slurry: 400 grams of ion exchange resin B, 14.9 grams of polymer 7 (Versa® TL-125), 27.4 grams of 28% ammonia, 380.0 grams of water. The mean particle size of the ground material was about 5 microns.

Pre-Treated Resin C was prepared the same as Pre-Treated resin B, but with polymer 5 as the pre-treatment polymer. The following blend of materials was ground as in Untreated resin A to give a total solids on resin of 20%: 550 grams of ion exchange resin B, 16.5 grams of polymer solution 5, 25 grams of ammonia, 508.5 grams of water.

Pre-Treated Resin D was prepared following the same grinding procedure as Untreated resin A with the following list of ingredients: 440 grams of ion exchange resin A, 29.04 grams of polymer 5, 225 grams of 20% acetic acid, 516 grams of water. The total solids on resin was 20%.

Pre-Treated Resin E was prepared following the same grinding procedure as Untreated resin A with the following list of ingredients: 350 grams of ion exchange resin A, 23.1 grams of polymer 5, 74.90 grams of 85% lactic acid, 514.5 grams of water. The total solids on resin was 20%.

Pre-Treated Resin F was prepared following the same grinding procedure as Untreated resin A with the following list of ingredients: 440 grams of ion exchange resin A, 127 grams of polymer 1, 37 grams of 20% acetic acid, 606 grams of water. The total solids on resin was 20%.

Pre-Treated Resin G was prepared following the same grinding procedure as Untreated resin A with the following list of ingredients: 440 grams of ion exchange resin A, 45.11 grams of polymer 3, 190.5 grams of 20% acetic acid, 534.5 grams of water. The total solids on resin was 20%.

Pre-Treated Resin H—The ion exchange resin in this sample (ion exchange resin C) was a macroreticular weakly basic polystyrene/divinyl benzene based resin (Amberlite® IRA-93, Rohm and Haas Company). It had a moisture content of 57% and exchange capacity of 1.3 meq/ml. The material was ground as described in Untreated resin A with the following list of ingredients: 200 grams of ion exchange resin C, 4.26 grams of polymer 11, 230 grams of water. The total solids on resin was 19.80%.

Pre-Treated Resin I—The ion exchange resin in this sample (ion exchange resin D) was a macroreticular quaternary ammonium functional anion exchange resin based on a polystyrene/divinyl benzene based resin (Amberlite® IRA-900, Rohm and Haas Company). It had a moisture content of 59%, an exchange capacity of 1.0 meq/ml, and was in the chloride form. The material was ground as described in Untreated resin A with the following list of ingredients: 200 grams of ion exchange resin D, 26.67 grams of polymer 11, 210 grams of water. The total solids on resin was 18.80%.

Pre-Treated Resin J was prepared following the same grinding procedure as Untreated resin A with the following list of ingredients: 400 grams of ion exchange resin A, 36.7 grams of polymer 6, 92.4 grams of 85% lactic acid, 570.9 grams of water. The total solids on resin was 20%.

Pre-Treated Resin K was prepared following the same grinding procedure as Untreated resin A with the following list of ingredients: 440 grams of ion exchange resin A, 29.04 grams of polymer 5, and 646 grams of water. The total solids on resin was 21.7%.

Examples 1A–1D

Measuring The Pre-treatment Polymer Demand Of The Ion Exchange Resin As A Function Of The Molecular Weight Of The Polymer.

The ion exchange resin particles of ion exchange resin A contain quaternary ammonium functional groups present on the surface of the particles, and also these functional groups are present in the interior of the particles. As the particle size of the particles decreases, the ratio of surface groups to interior groups increases. This invention blends these positively charged ion exchange particles with negatively charged latex polymer dispersions and negatively charged pigment particles dispersions to make paint and coatings. In order to make the above type of blends without causing colloidal stability problems, it is necessary to treat the surface of the ion exchange resin. This can be done by pre-treating the resin with water soluble anionic polymers like polyacrylic acid etc.

The amount of the water soluble anionic polymer needed to provide the above type of treatment will depend on the treatment polymer MW, micro porosity of the ion exchange resin (degree of crosslinking and composition), and also the composition of the water soluble polymer as it affects the ability of the polymer to diffuse to ion exchange sites. The general principle of the MW effect is demonstrated by the following examples for one class of polymer, polyacrylic acid.

Ion exchange resin A was titrated with sodium salts of polyacrylic acid of varying MW to determine the polymer demand. Titrations were done using an automatic titrator from Schott Gerate (model TR600). End points were determined conductometrically. For example, 2 grams of example, Untreated Resin A Dispersion was placed in a beaker and diluted to about 100 mls with deionized water. The sample was then titrated with 0.05 milliequivents/gram acrylic acid sodium salt solutions to a conductometric end point. The data for acrylic acid titrations are reported in Table 1 as the dry grams of treatment polymer per dry gram of Ion Exchange Resin A that the particular molecular weight of acrylic acid is able to react or complex with.

TABLE 1

| Example | Polymer | Weight Average MW | Grams Of Treatment Polymer/Gram Resin |
|---------|---------|-------------------|---------------------------------------|
| 1A | 1 | 2000 | 0.20 |
| 1B | 2 | 10000 | 0.06 |
| 1C | 3 | 26400 | 0.04 |
| 1D | 4 | 50000 | 0.03 |

The above data demonstrate that as the molecular weight of the water-soluble anionic polymer increases, the amount of polymer needed to pre-treat the resin decreases.

Examples 2–8

The Correlation Between Titration Polymer Demand And Grit Formation.

Ion exchange resin A was mixed with the different MW acrylic acid samples where the level of acrylic acid to resin is 0, 0.5, or 1.25 times the grams of treatment polymer/gram resin from Examples 1A–1D. The pre-treated resin was then mixed with a typical latex polymer dispersion used for making paints or coatings. The mixture was then applied to a panel and dried at room temperature for 3 hours. Films were cast on black vinyl using a 3 mil bird applicator. After drying the grit in the film was rated. The presence of grit indicates colloidal stability problems in the blend. Grit was rated by visually observing a coated panel at a low angle and rated on a 1 to 10 scale with 10 being no grit. A rating of greater than 8 is considered to be grit-free.

Example 2. To 20 grams of Untreated resin A Dispersion was added 2.1 grams of Polymer 1 with good mixing. This mix was then mixed with 40 grams of an anionic styrene/acrylic latex dispersion of 50% total solids (Rhoplex® P-376). Films were cast and rated as above.

Example 3. To 20 grams of Untreated resin A Dispersion was added 0.76 grams of Polymer 2 with good mixing. This mix was then mixed with 40 grams of an anionic styrene/acrylic latex dispersion of 50% total solids (Rhoplex® P-376). Films were cast and rated as above.

Example 4. To 20 grams of Untreated resin A Dispersion was added 0.46 grams of Polymer 3 with good mixing. This mix was then mixed with 40 grams of an anionic styrene/acrylic latex dispersion of 50% total solids (Rhoplex® P-376). Films were cast and rated as above.

Example 5. To 20 grams of Untreated resin A Dispersion was added 0.58 grams of Polymer 4 with good mixing. This mix was then mixed with 40 grams of an anionic styrene/acrylic latex dispersion of 50% total solids (Rhoplex® P-376). Films were cast and rated as above.

Example 6. To 40 grams of an anionic styrene/acrylic latex dispersion of 50% total solids (Rhoplex® P-376) was added 20 grams of Untreated resin A Dispersion with no pre-treatment. Films were cast and rated as above.

Example 7. To 20 grams of Untreated resin A Dispersion was added 0.84 grams of Polymer 1 (0.5×titration level) with good mixing. This mix was then mixed with 40 grams of an anionic styrene/acrylic latex dispersion of 50% total solids (Rhoplex® P-376). Films were cast and rated as above.

Example 8 (Post-Treatment). To 40 grams of Rhoplex® P-376 was added 0.46 grams of Polymer 3 with good mixing. To this blend was added 20 grams of Untreated resin A Dispersion with good mixing. Films were cast and rated as above. The results of Examples 2–8 are shown in Table 2.

Rhoplex® P-376, Rhoplex®AC-630, Rhoplex®2235, Rhoplex®AC-264, and Rhoplex®AC-507 are acrylic binders available through Rohm and Haas Company.

TABLE 2

| Example | Treatment Polymer | g Treatment Polymer/ g Resin | Resin Pre-Treated | Appearance of Cast Films |
| --- | --- | --- | --- | --- |
| 6* | none | 0 | no | 2 |
| 7 | 1 | 0.10 | yes | 4 |
| 2 | 1 | 0.25 | yes | 10 |
| 3 | 2 | 0.075 | yes | 10 |
| 4 | 3 | 0.05 | yes | 10 |
| 5 | 4 | 0.038 | yes | 10 |
| 8 | 3 | 0.05 | Post-Treated | 2 |

* = Comparative Example

The above data demonstrates that as the molecular weight of the water-soluble anionic polymer increases, less of the polymer is needed to prevent grit in coating compositions. When the ion exchange resin is not pre-treated with a water-soluble anionic polymer, a high amount of grit forms.

Examples 9–14

Grit Formation In Various Latex Dispersions.

These examples were run to show that the inhibition of grit formation by pre-treating the ion exchange resin with a water soluble anionic polymer is not limited to Rhoplex® P-376.

In the following examples, 0.46 grams and 0 grams of water-soluble anionic polymer 3 (1.25×titration and 0×titration) were respectively mixed with 20 grams of Untreated resin A Dispersion with good mixing. This blend was then mixed with different anionic latexes to give a 20% solids sample A resin level on latex polymer solids. Films were cast and rated for grit as above. The results are shown in Table 3.

TABLE 3

| Example | Polymer level | Latex Polymer Dispersion | Film Appearance |
| --- | --- | --- | --- |
| 9 | 1.25 x | Rhoplex ® P-376 | 10 |
| 10 | 0 x | Rhoplex ® P-376 | 2 |
| 11 | 1.25 x | Rhoplex ® AC-630 | 10 |
| 12 | 0 x | Rhoplex ® AC-630 | 4 |
| 13 | 1.25 x | Rhoplex ® 2235 | 10 |
| 14 | 0 x | Rhoplex ® 2235 | 2 |

The above data demonstrates that inhibition of grit formation by pre-treating the ion exchange resin with a water soluble anionic polymer is not limited to Rhoplex®P-376.

Test Method For Tannin Stain Blocking

The test paint was painted on severe, dark redwood siding panels at a coverage rate of 400 ft$^2$/gal and allowed to dry for 2 hours. The test paint was then top coated with semigloss paint 3 at the same coverage rate and placed in a 100% relative humidity box for 18 hr. During this time the moisture in the topcoat acts to pull stains up from the wood through the primer and into the top coat. The painted panels were then taken out of the humidity box to allow the top coat to dry at ambient conditions. The stain blocking ability of the test primer was rated after an additional 24 hours on a scale of 1 to 10 where 10 represents no signs of staining.

The results of these tests are shown in Table 13.

Nicotine Stain Blocking.

Nicotine staining solution was made by extracting the nicotine staining material from cigarette butts. Thirty butts were placed in 300 grams of water and allowed to soak for 24 hours. The solution was filtered through a 325 mesh screen to remove any large solids. The solution was brushed on to a substrate painted with a white interior flat paint (Sears Easy Living) and allowed to dry for 24 hours before testing. The test paint was painted on to the above panels at a coverage rate of 400 ft$^2$/gal and allowed to dry for 2 hours. The test paint was then top coated with Semigloss paint 3 at the same coverage rate and allowed to dry at ambient consitions. The stain blocking ability of the test primer was rated after an additional 24 hours on a scale of 1 to 10 where 10 represents no signs of staining.

The results of these tests are shown in Table 14.

Test Method For Efflorescence.

Efflorescence is an appearance defect of paints placed on cementitious substrates caused by the migration of salt to the paint surface where crystals of these salts show up as white deposits. The defects are particularly noticeable on darker colored paints. Ion exchange resins in paints take up salt ions and inhibit efflorescence. Anion resins in the hydroxyl form are particularly useful for this application.

Cement panels were prepared by mixing 1174.5 grams of 45 mesh sand, 261 grams of Portland 1 cement, 148.8 grams of type S lime, and 261 grams of water. Panels were cast that are 0.5×4×6 inches in dimensions. The panels were cured at ambient conditions for 24 hours and were then given 2 coats of test paint with 3 hours between coats. Coats were applied at 400 ft$^2$/gal. The second coat was allowed to dry for 24 hours and then the panels were placed painted side out on a Cleveland Condensation tester cabinet so that moisture was driven through the back side of the panel and out through the paint carrying salts in the panel with it. The cabinet was set at 40 ° C. with a 50% on cycle so that the panels went through wet and dry cycles for one week before rating the panels on a 1 to 10 scale for efflorescence resistance. Ten means no white deposits are seen. The results of these tests are shown in Table 15.

Water Spot Testing.

Ion exchange resins can help water spotting by insolubilizing water soluble materials in paints. These water soluble materials (salts, surfactants, thickeners, dispersants, etc.) in latex paints can be extracted by water to form water spots in conventional paints.

Test paints were coated onto aluminum panels using a 3 mil bird and allowed to dry for 24 hours. Drops of deionized water were randomly dropped on the paint and allowed to dry slowly at 50% RH/78 ° F. The panels were examined for signs of water spots and rated on a 1 to 10 scale with 10 meaning no spots can be seen.

The results of these tests are shown in Table 15. The rating system for all stain and grit testing was as follows:

10=none
9=trace
8=trace/slight
7=slight
6=slight/moderate
5=moderate
4=moderate/heavy
3=heavy
2=heavy/very heavy
1=very heavy A rating of greater than 8 is considered to be grit-free for practical purposes of appearance.

Contrast Ratio

Paints were drawn down on 5C opacity charts from Leneta Co. using a 3 mil bird. The paints were allowed to dry for 4 hours at room temperature and the reflectance was measured on the white and black areas of the chart using a Glossgard 45° reflectometer. The contrast ratio is the black reflectance/white reflectance and is a measure of paint hiding.

The following paints were prepared for testing the effects on paint properties of pre-treating an ion exchange resin with a water soluble anionic polymer versus post treating the ion exchange resin with the water soluble anionic polymer.

A pigment dispersion stock for the paints was made according to Table 4. The materials were dispersed using a Cowles mill.

TABLE 4

Pigment Dispersion Stock

| Material | Grams |
| --- | --- |
| Tamol ® 2001 (Rohm & Haas Company) | 4.9 |
| 28% ammonium hydroxide | 10 |
| water | 33.2 |
| Ti-Pure ® R-900 (Du Pont) | 105 |
| Drew Plus ® L-475 (Ashland Chem. Co.) | 1 |
| Total | 145.1 |

Ingredients were added in the order listed. Good mixing was maintained at all times with an overhead stirrer. In paint 1, the treatment polymer was mixed with all the other paint ingredients before the ion exchange dispersion was added into the formulation. In example paint 2, the resin was pretreated with polymer 3 before being mixed into the formulation.

TABLE 5

Paints 1 and 2

| Material | Paint 1 - resin post treated Grams | Paint 2 - resin pretreated Grams |
| --- | --- | --- |
| Pigment Dispersion | 14.51 | 14.51 |
| Rhoplex ® P-376 polymer dispersion | 43.9 | 43.9 |
| Dipropylene glycol n-butyl ether | 0.55 | 0.55 |
| Polymer 3 | 0.58 | — |
| Untreated resin A Dispersion | 25.2* | 25.2* |
| 20% Acetic acid | 3.97* | 3.97* |
| Polymer 3 | — | 0.58* |
| Drew Plus ® L-475 | 0.1 | 0.1 |
| Acrysol ® RM-2020 thickener (Rohm & Haas Company) | 0.95 | 0.95 |

* These ingredients were premixed together before being added to the previous ingredients.

The effect of pre-treatment of the ion exchange resin on paint properties is shown in Table 6.

TABLE 6

| Paint | Pre-treated | Redwood Stain Blocking | Grit in dry paint film (10 best) | Contrast Ratio |
| --- | --- | --- | --- | --- |
| 1 | no | 9 | 6 | 0.868 |
| 2 | yes | 9 | 9 | 0.930 |

The higher the contrast ratio, the better is the quality of dispersion of the $TiO_2$ in the paint. When the resin is not pretreated, the grit level is high and the $TiO_2$ in the paint is flocculated as indicated by the decrease in hiding. A difference of 0.062 in contrast ratio is quite significant and the difference in whiteness between the two paints is easily seen by eye.

The following paints were prepared for demonstrating Redwood and Nicotine stain blocking, and efflorescence and water spot resistance:

TABLE 7

Paint 3 - Semi-Gloss Paint

| Material | Grams |
| --- | --- |
| Propylene glycol | 70 |
| Tamol ® 731 (25%) (Rohm and Haas Company) | 14.9 |
| Nopco ® NXZ defoamer (Henkel) | 1 |
| Water | 20 |
| Ti-Pure ® R-900 | 275 |
| The above materials were mixed on a high speed Cowles Mill to give a good dispersion. | |
| The following were mixed with good stirring: | |
| Water | 50 |
| Rhoplex ® AC-507 polymer dispersion (46.5%) | 546.7 |
| Nopco ® NXZ | 1 |
| Ammonium Hydroxide (28%) | 2 |

TABLE 7-continued

Paint 3 - Semi-Gloss Paint

| Material | Grams |
| --- | --- |
| Propylene glycol | 30 |
| Acrysol ® G-110 (22%) (Rohm & Haas Company) | 10* |
| Water | 24.5* |

\* = sample was premixed

TABLE 8

Paint 4 - Control Paint With No Ion Exchange Dispersion.

| Material | Grams |
| --- | --- |
| Tamol ® 2001 dispersant 43% | 4.84 |
| 28% ammonium hydroxide | 0.97 |
| water | 53.07 |
| Minex ® 4 extender (Indusmin) | 103.92 |
| Ti-Pure ® R-900 pigment | 103.92 |
| Drew Plus ® L-475 | 1 |
| The above were mixed at high speed on a Cowles dissolver. Following mixed at a lower speed: | |
| Rhoplex ® P-376 latex polymer 50% | 434.52 |
| Texanol ® (Eastman Chemical) | 5.43 |
| Drew Plus ® L-475 defoamer | 1 |
| Acrysol ® RM-2020 thickener (20%) (Rohm & Haas Company) | 28.47 |
| water | 257.33 |
| extender volume concentration | 15% |
| volume solids | 33% |

TABLE 9

Paint 5 - Anion exchange dispersion Paint

| Material | Grams |
| --- | --- |
| Tamol ® 2001 dispersant 43% | 4.84 |
| 28% ammonium hydroxide | 0.98 |
| water | 33.24 |
| Ti-Pure ® R-900 pigment | 104.98 |
| Drew Plus ® L-475 defoamer | 1 |
| The above were mixed at high speed on a Cowles dissolver. Following mixed at a lower speed: | |
| Rhoplex ® P-376 latex polymer 50% | 438.96 |
| Texanol ® | 5.48 |
| Pre-Treated resin D | 252.1 |
| Drew Plus ® L-475 | 1 |
| Acrysol ® RM-2020 thickener (20%) | 23.93 |
| water | 79.5 |
| anion resin volume concentration | 15% |
| volume solids | 33% |

Paint 6—Anion exchange dispersion Paint.

This paint was the same as paint 4, except the anion exchange dispersion in this case was pre-treated resin E.

Paint 7—Anion exchange dispersion Paint.

This example was the same as paint 4, except the anion exchange dispersion in this case was pre-treated resin F.

Paint 8—Anion exchange dispersion Paint.

This example was the same as paint 4, except the anion exchange dispersion in this case was pre-treated resin G.

Paint 9—Anion exchange dispersion Paint.

This example was the same as paint 4, except the anion exchange dispersion in this case was pre-treated resin J.

Paint 10—Mixed bed exchange dispersion Paint.

This example was the same as paint 4, except the resin dispersion in this case was a mixed bed dispersion, pre-treated resin B.

Paint 11—Mixed bed exchange dispersion Paint.

This example was the same as paint 4, except the resin dispersion in this case was a mixed bed dispersion, pre-treated resin C.

Paint 12—Weak base macroreticular exchange dispersion Paint.

This example was the same as paint 4, except the resin dispersion in this case was the weak base macroreticular dispersion, pre-treated resin H.

Paint 13—Quaternary ammonium, macroreticular, anion exchange dispersion Paint.

This example was the same as paint 4, except the resin dispersion in this case was Quaternary ammonium, macroreticular, anion exchange dispersion, pre-treated resin I.

TABLE 10

Paint 14 - Control Paint.

| Material | Grams |
| --- | --- |
| Tamol ® 2001 | 15.31 |
| 28% ammonium hydroxide | 1.57 |
| ethylene glycol | 26.57 |
| water | 91.17 |
| Mapico 422 red iron oxide (Columbian Chemical) | 111.57 |
| Silica 1160 (Illinois Mineral) | 213.51 |
| Attagel ® 50 (Engelhard) | 4.05 |
| Drew Plus ® L-475 | 2 |
| The above materials were mixed on a high speed Cowles dissolver. The following materials were mixed in at reduced speed: | |
| Rhoplex ® AC-264 latex polymer (60.5%) | 279.72 |
| Texanol ® | 4.23 |
| Pre-Treated resin K | 0 |
| Drew Plus ® L-475 | 1 |
| Acrysol ® RM-825 (25%) (Rohm & Haas) | 73.86 |
| water | 253.45 |
| Pigment volume concentration | 41.26% |
| Volume concentration of anion resin dispersion | 0 |
| volume solids | 32.7% |

TABLE 11

Paint 15 - 15% volume concentration anion dispersion paint.

| Material | Grams |
| --- | --- |
| Tamol ® 2001 | 10.76 |
| 28% ammonium hydroxide | 1.1 |
| ethylene glycol | 27.04 |
| water | 92.79 |
| Mapico 422 red iron oxide (Columbian Chemical) | 113.55 |
| Silica 1160 (Illinois Mineral) | 113.69 |
| Attagel ® 50 (Engelhard) | 4.12 |
| Drew Plus ® L-475 | 5.87 |
| The above materials were mixed on a high speed Cowles dissolver. The following materials were mixed in at reduced speed: | |
| Rhoplex ® AC-264 latex polymer (60.5%) | 284.69 |
| Texanol ® | 4.31 |

TABLE 11-continued

Paint 15 - 15% volume concentration anion dispersion paint.

| Material | Grams |
| --- | --- |
| Pre-Treated resin K | 226 |
| Drew Plus ® L-475 | 0.6 |
| Acrysol ® RM-825 (25%) | 20 |
| water | 121 |
| Pigment volume concentration | 41.26% |
| Volume concentration of anion resin dispersion | 15% |
| volume solids | 32.8% |

TABLE 12

Paint 16 - 31.45 % volume concentration anion dispersion paint.

| Material | Grams |
| --- | --- |
| Tamol ® 2001 | 5.41 |
| 28% ammonium hydroxide | 0.56 |
| ethylene glycol | 26.72 |
| water | 33.14 |
| Mapico 422 red iron oxide (Columbian Chemical) | 112.2 |
| Silica 1160 (Illinois Mineral) | 0 |
| Attagel ® 50 (Engelhard) | 4.07 |
| Drew Plus ® L-475 | 5.80 |
| The above material were mixed on a high speed Cowles dissolver. The following materials were mixed in at reduced speed: | |
| Rhoplex ® AC-264 latex polymer (60.5%) | 281.31 |
| Texanol ® | 4.26 |
| Pre-Treated resin K | 468 |
| Drew Plus ® L-475 | 0.6 |
| Acrysol ® RM-825 (25%) | 20 |
| Pigment volume concentration | 41.26% |
| Volume concentration of anion resin dispersion | 31.45% |
| volume solids | 32.4% |

TABLE 13

| Paint | Variable | Tannin Stain Blocking |
| --- | --- | --- |
| 4* | Control primer - no ion exchange dispersion | 4 |
| 5 | Anion resin dispersion with 70% AA/30% Maleic anhydride treatment polymer | 9 |
| 6 | Anion resin dispersion with 70% AA/30% Maleic anaydride treatment polymer with lactic acid as counter ion in resin dispersion | 9 |
| 7 | Anion resin dispersion with Acrylic acid, $M_w$ = 2000 treatment polymer | 8 |
| 8 | Anion resin dispersion with Acrylic acid, $M_w$ = 2000 treatment polymer with Acrylic acid, = 26,400 treatment polymer | 9 |
| 9 | Anion resin dispersion with polystyrene sulfonic acid (PSA) treatment polymer | 9 |
| 10 | Mixed bed resin dispersion with PSA treatment polymer | 7 |
| 11 | Mixed bed resin dispersion with PSA treatment polymer with 70% AA/30% maleic anhydride treatment polymer | 7 |
| 12 | Weak base anion resin dispersion | 7 |

TABLE 13-continued

| Paint | Variable | Tannin Stain Blocking |
| --- | --- | --- |
| 13 | Macroreticular anion resin | 8 |
| x | Exterior oil based alkyd primer control (Sears Weatherbeater) | 9 |

\* = Control Sample
x = Comparative Sample

The above data demonstrates that tannin stain blocking is greatly improved with the compositions of this invention.

TABLE 14

| Paint | Variable | Nicotine Stain Blocking |
| --- | --- | --- |
| 4* | Control primer - no ion exchange dispersion | 3 |
| 5 | Anion resin dispersion | 9 |
| 10 | Mixed bed dispersion | 9 |
| 12 | Weak base anion resin dispersion | 8 |
| 13 | Macroreticular anion resin | 9 |

\* = Control Sample

The above data demonstrates that nicotine stain blocking is greatly improved with the compositions of this invention.

TABLE 15

| Paint | Volume Concentration of Anion Resin | Efflorescence Resistance | Water Spot Resistance |
| --- | --- | --- | --- |
| 14* | 0 | 2 | 1 |
| 15 | 15% | 6 | 8 |
| 16 | 31.45% | 9 | 10 |

\* = Control Sample

The above data demonstrates that efflorescence resistance and water spot resistance are greatly improved with the compositions of this invention.

What is claimed:

1. A grit-free coating composition comprising an emulsion polymer; an ion exchange resin with a particle size of from 0.1 microns to 50 microns; and fro 3% to 15% in excess of the amount necessary to disperse a pigment in the coating composition, based on the weight of the ion-exchange resin, of a water-soluble anionic polymer with a molecular weight of from 2,000 to 200,000, the ion exchange resin having been treated with the water-soluble anionic polymer prior to combination with the emulsion polymer.

2. The composition according to claim 1 wherein said emulsion polymer is selected from the group consisting of acrylic polymers, polystyrene, polyvinyl acetate, and acrylate ester/styrene copolymers.

3. The composition according to claim 1 wherein said ion exchange resin is selected from the group consisting of an anion exchange resin and a mixed bed exchange resin.

4. A method of producing a grit-free coating composition comprising:

(a) providing an ion exchange resin, (b) providing a water-soluble anionic polymer with a molecular weight of from 2,000 to 200,000, (c) grinding the ion exchange resin to a particle size of from 0.1 microns to 50 microns, (d) treating the ion exchange resin with the water-soluble anionic polymer, (e) providing an emulsion polymer, and (f) admixing the ground, treated, ion exchange resin and the emulsion polymer.

5. The method according to claim 4 wherein said emulsion polymer is selected from the group consisting of acrylic polymers, acrylic ester polymers, polystyrene, vinyl acetate, and acrylic acid/styrene copolymers.

6. The method according to claim 4 wherein said ion exchange resin is selected from the group consisting of an anion exchange resin and a mixed bed exchange resin.

7. The method according to claim 4 wherein efflorescence of the coating composition is improved to a rating of greater than 5 on a scale of 1 to 10, wherein 10 represents no white spots.

8. The method according to claim 4 wherein tannin stain blocking of the coating composition is improved to a rating of greater than 6 on a scale of 1 to 10, wherein 10 represents no sign of tannin staining.

9. The method according to claim 4 wherein nicotine stain blocking of the composition is improved to a rating of greater than 7 on a scale of 1 to 10, wherein 10 represents no sign of nicotine staining.

10. The method according to claim 4 wherein water spot resistance of the coating composition is improved to a rating of greater than 7 on a scale of 1 to 10, wherein 10 represents no sign of water spots.

* * * * *

UNITED STATES PATENT AND TRADEMARK OFFICE
CERTIFICATE OF CORRECTION

PATENT NO : 5,922,777
DATED : July 13, 1999
INVENTOR(S) : Paul Ralph Van Rheenen It is certified that error appears in the above-identified patent and that said Letters Patent is hereby corrected as shown below:

Cover Page [57} ABSTRACT, replace "Gift free coating" with "Grit free coating"

Column 2, line 54, replace "polycarboduimide," with "polycarbodiimide"

Column 18, line 45 of claim 1, replace "; and fro 3% to 15%" with "; and from 3% to 15%"

Signed and Sealed this

Seventh Day of December, 1999

Attest:

Attesting Officer

Q. TODD DICKINSON

Acting Commissioner of Patents and Trademarks